UNITED STATES PATENT OFFICE.

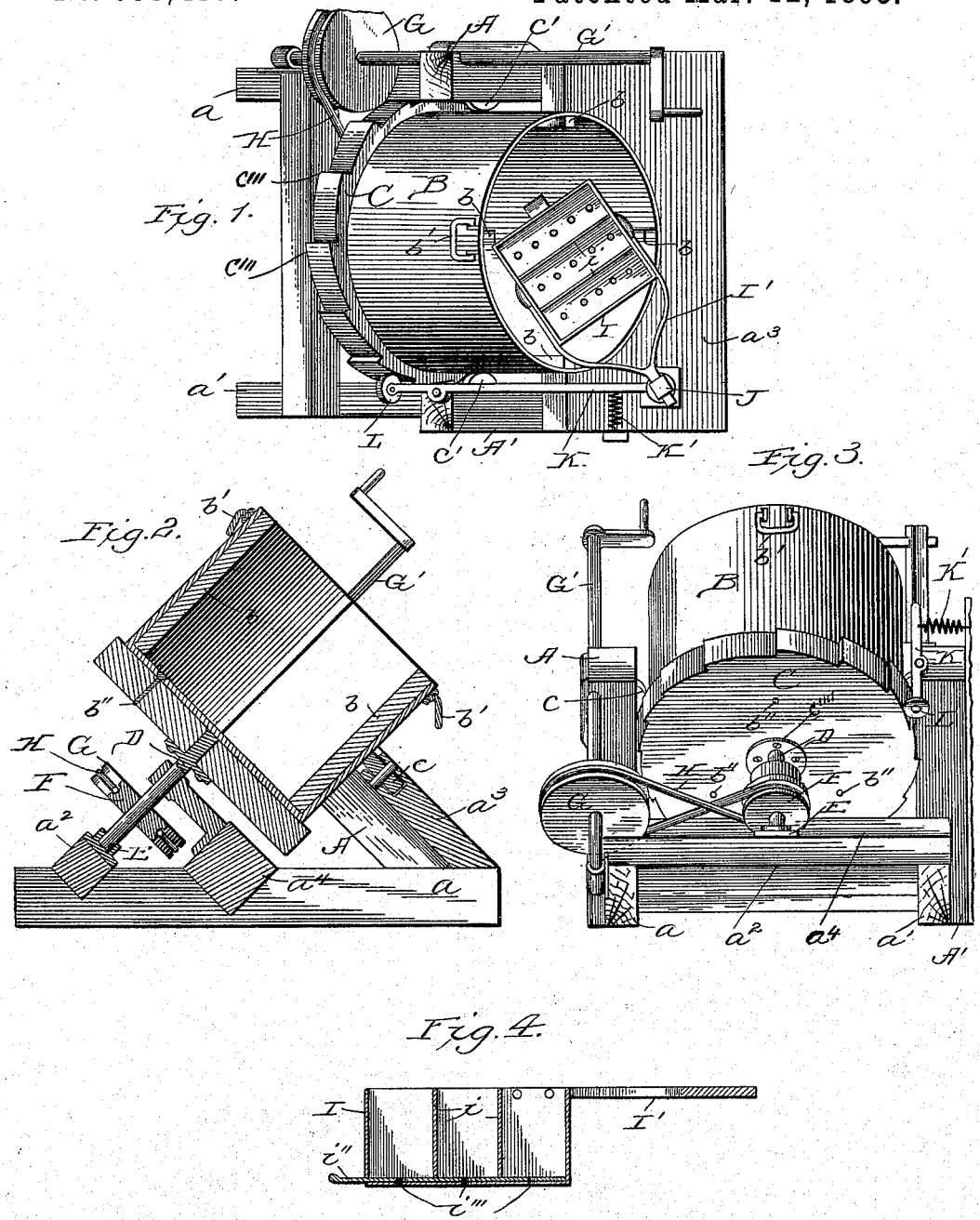

DAVID E. SAMPSON, OF EAST BEND, NORTH CAROLINA.

FEED MIXING AND MEASURING DEVICE.

SPECIFICATION forming part of Letters Patent No. 535,417, dated March 12, 1895.

Application filed December 8, 1894. Serial No. 531,234. (No model.)

*To all whom it may concern:*

Be it known that I, DAVID E. SAMPSON, a citizen of England, residing at East Bend, in the county of Yadkin and State of North Carolina, have invented certain new and useful Improvements in Feed Mixing and Measuring Devices; and I do declare the following to be a full, clear, and exact description of the invention, such as will enable others skilled in the art to which it appertains to make and use the same, reference being had to the accompanying drawings, and to the letters of reference marked thereon, which form a part of this specification.

The purpose and effect of my invention are to provide a more efficient, cleanly and thorough means of mixing and measuring feed for cattle and other stock, than is attained by the ordinary manual operation, and consists of the devices and appliances hereinafter described and shown by the drawings hereto annexed, in which—

Figure 1 represents a top view of the invention; Fig. 2, a horizontal sectional view; Fig. 3, a back view; Fig. 4, the sifter box, I.

Letters A A' in said drawings represent the upright or diagonal supports secured to the horizontal plates, $a$ $a'$.

B is a cylindrical tub-shaped vessel, metal or other material, which is attached by bolts, $b''$ $b''$ $b''$, projecting from the outer side of its bottom to the cam wheel C, said bolts fitting sufficiently snugly into bolt holes on said cam wheel C to secure it firmly in position, yet so that the vessel may be detached without trouble when desired.

C is a cam wheel a little larger than the bottom of vessel, B, to permit the operation of the cams, $c'''$, thereon, and is secured on shaft, D. F is also a pulley secured on said shaft, D, which shaft runs in box, E, in the cross braces, $a''$ $a''''$, and is secured to plate $c''''$ bolted to C.

G' is a crank shaft running in boxes on A and $a''$ and having a pulley, G, secured thereon from which belt, H, runs to and around said pulley, F.

$c$ $c'$ $c''$ are friction rollers on supports, A A', and $a^3$, between and resting on which rollers, vessel, B, rotates, when the device is running.

Fig. 4 represents a device which I call a sifter box consisting of a square or oblong box, wood or metal, having a double bottom, the lower one in close proximity to the upper one, but sliding, and both perforated with holes of like size and location, and so arranged that in a certain position of the sliding bottom the holes will be closed as if in a solid piece, while by a suitable sliding movement the holes of both will correspond and form a continuous hole as shown in Fig. 1, letter I. This box, I, may have subdivisions, $i$, as shown to afford different measures of feed. It has a handle, I', fitting into a socket, J, resting on a support rising from A' and the position of said box I, should be so adjusted by the angle of its handle I', to the rod K that it will project into vessel B, and over the cut feed therein.

K is a rod pivoted on A' and having at its other end a small pulley, L, which rests in contact with the cams, $c'''$ $c'''$, on rim of pulley, C, and has a spring, K', near its other end which keeps pulley, L, in contact with said cams.

The subdivisions in this sifter box should be detachable so that a greater or less quantity of grain or meal feed may be measured and prepared at one time, and the use and purpose of the whole device is that to a given portion of cut fodder, corn or straw, deposited in vessel, B. When said vessel is secured to cam wheel C a proper quantity of grain or meal may be sifted thereon from the box, I, and the operation consists in rotating said vessel, B, by means of the crank shaft, G', and the vibratory motion of the box, I, when placed in position as shown by Fig. 1, with the bottoms so adjusted that the grain or meal shall have free course to sift through the holes, whereby the meal or grain is distributed evenly and thoroughly mixed and incorporated with the cut feed as it revolves in vessel, B. The vibrating or oscillating motion is produced by the action of the rod K attached to said handle I', and pivoted at A', and held with pulley L, at its other end in close contact with the periphery of cam wheel C, by spring K'. It is obvious that the oscillating motion imparted by cams $c'''$ when the cam wheel revolves, will cause a corresponding motion to the other end of rod K and box I.

Vessel, B, may also, when detached, be used to convey the mixed feed to feeding troughs for which purpose the handles, $b'$, will prove useful. There are also lugs or ribs $k$ running longitudinally inside of said vessel, B, to prevent the contents being whirled in a mass, which would prevent a perfect incorporation of the meal or grain therewith.

The vessel, B, should be hung and rotated at an upward angle from the rear to prevent the contents from being thrown out by the rotary motion, though it may be rotated horizontally with a lid and the sifter box detached.

Having described my invention, what I claim, and desire to secure by Letters Patent, is—

In a feed mixing and measuring device— the cylindrical detachable vessel B, secured to the cam wheel C;—the cam wheel C, and crank shaft, belts and pulleys to rotate the same; the sifter-box I, having a perforated bottom, and a perforated sliding plate thereon; the vibrating pivoted rod K adapted to be acted upon by the cam wheel C and connected to the sifter box at the end opposite the cams, pulley L, and spring $K'$ to hold the pulley in engagement with the cam—all constructed arranged and combined to operate substantially as shown and described.

In testimony whereof I affix my signature in presence of two witnesses.

DAVID E. SAMPSON.

Witnesses:
  I. H. TREVITTE,
  WM. PIGGOTT.